(12) United States Patent
Weiner et al.

(10) Patent No.: US 7,706,784 B2
(45) Date of Patent: Apr. 27, 2010

(54) METHOD AND SYSTEM FOR PROVIDING A PRODUCT OR SERVICE USING A MOBILE COMMUNICATION DEVICE

(75) Inventors: Avish Jacob Weiner, Tel Aviv (IL); Dror Fixler, Ganei Tikva (IL)

(73) Assignee: AcCells Technologies (2009), Ltd., Petach Tivka (IL)

( * ) Notice: Subject to any disclaimer, the term of this patent is extended or adjusted under 35 U.S.C. 154(b) by 0 days.

(21) Appl. No.: 12/048,475

(22) Filed: Mar. 14, 2008

(65) Prior Publication Data

US 2009/0233583 A1 Sep. 17, 2009

(51) Int. Cl.
*H04M 3/42* (2006.01)
(52) U.S. Cl. .................. 455/414.1; 455/411; 455/88; 455/424; 455/562.1
(58) Field of Classification Search ............. 455/414.1, 455/561, 561.1, 35.1, 411, 562.1
See application file for complete search history.

(56) References Cited

U.S. PATENT DOCUMENTS

| | | | |
|---|---|---|---|
| 7,209,741 B2* | 4/2007 | Julka et al. ............... 455/435.1 |
| 7,310,307 B1* | 12/2007 | Das et al. .................... 370/229 |
| 7,359,885 B2 | 4/2008 | Yan |
| 7,366,913 B1 | 4/2008 | Haley |
| 7,482,925 B2* | 1/2009 | Hammad et al. ......... 340/572.1 |
| 2001/0014870 A1 | 8/2001 | Saito et al. |
| 2003/0056114 A1* | 3/2003 | Goland ...................... 713/201 |
| 2003/0193441 A1* | 10/2003 | Zimmerman et al. ........ 343/725 |
| 2004/0023647 A1* | 2/2004 | Mazzara et al. ............. 455/419 |
| 2004/0121781 A1* | 6/2004 | Sammarco ................ 455/456.1 |
| 2004/0142685 A1* | 7/2004 | Glasser et al. .............. 455/420 |
| 2005/0170842 A1* | 8/2005 | Chen ......................... 455/454 |
| 2005/0176482 A1* | 8/2005 | Raisinghani et al. ...... 455/575.9 |
| 2005/0185626 A1* | 8/2005 | Meier et al. ................ 370/338 |
| 2005/0242921 A1* | 11/2005 | Zimmerman et al. ......... 340/5.2 |
| 2005/0255889 A1* | 11/2005 | Haseba et al. .............. 455/561 |
| 2006/0033608 A1* | 2/2006 | Juels et al. ................. 340/10.1 |
| 2006/0044115 A1* | 3/2006 | Doi et al. ................. 340/10.42 |
| 2006/0271643 A1* | 11/2006 | Stallman .................... 709/217 |
| 2007/0140188 A1* | 6/2007 | Melkote et al. ............. 370/338 |
| 2008/0084272 A1 | 4/2008 | Modiano |
| 2008/0096494 A1 | 4/2008 | Chan et al. |
| 2008/0114699 A1 | 5/2008 | Yuan et al. |

FOREIGN PATENT DOCUMENTS

| | | |
|---|---|---|
| EP | 1424861 A1 | 6/2006 |
| WO | 9834421 A2 | 8/1998 |
| WO | WO 2007048976 A2 | 4/2007 |
| WO | WO 2008/040391 | 4/2008 |

OTHER PUBLICATIONS

International Search Report for PCT/IL2009/000263, European Patent Office, mail dated Jul. 6, 2009.
Written Opinion of the International Searching Authority for PCT/IL2009/000263, European Patent Office mail dated Jul. 6, 2009.

* cited by examiner

*Primary Examiner*—Charles N Appiah
*Assistant Examiner*—Kwasi Karikari
(74) *Attorney, Agent, or Firm*—Kahn, Simon

(57) ABSTRACT

A method and system for secure payment by using a mobile communication device, which may operate using substantially existing communication protocols, and securely identify the mobile device.

29 Claims, 5 Drawing Sheets under MethOD AND SYSTEM FOR PROVIDING A
PRODUCT OR SERVICE USING A MOBILE
COMMUNICATION DEVICE

BACKGROUND OF THE INVENTION

There are several known methods for providing a product, and in particular, payment for products or services other than phone usage or airtime, by using a mobile phone. In some known methods, the user may use the phone to call a phone number or send a text message, for example, according to instructions written on a machine providing the product or service. The user may then receive the service and the money may be debited through his mobile account. However, when the call or message is received, there is no certainty that the user is standing by the machine and ready to receive the service, and the product or service may be provided to a person other than the owner of the mobile phone account who is charged therefor.

Other methods of payment, for example, a method called Near Field Communication (NFC), may include pre-loading of a smart card, for example, a SIM or UICC, with an amount of money, wherein the smart card may be installed on the mobile phone, and the machine may have a smart card reader. Alternatively, a credit card may be loaded into the smart card. The money may be subtracted from the pre-loaded amount on the smart card or from the credit card account, for example, by RFID (radio frequency identification) technology. This method, however, typically requires a special design or modification of the mobile phone to include RFID communication elements separate from the telecommunications elements, and therefore, this method enables payment only by users having such specially adapted phones, and therefore, for example, this method is not available for any user of a mobile phone. This method may also require cooperation between the mobile network operator and a credit provider, for example, a bank.

There is therefore a need for a method and system for payment using a mobile phone or other communication device substantially using existing mobile phone hardware and/or communication protocols.

SUMMARY OF EMBODIMENTS OF THE INVENTION

The present invention provides a method and system for providing a product or service, and in particular for securing payment by using a mobile communication device, which may have the advantages of convenience, ability to work with substantially existing communication protocols, and the ability to identify the mobile device. The method and system according to the present invention may enable users of standard-issue mobile phones to pay using the device, substantially without requiring special additions or features to the mobile device itself and substantially without requiring modification to the hardware of existing mobile devices. An additional advantage of some features of embodiments of the invention may be to ensure that the person holding the mobile device is in proximity to the service station and is therefore the one receiving the product or service paid for.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
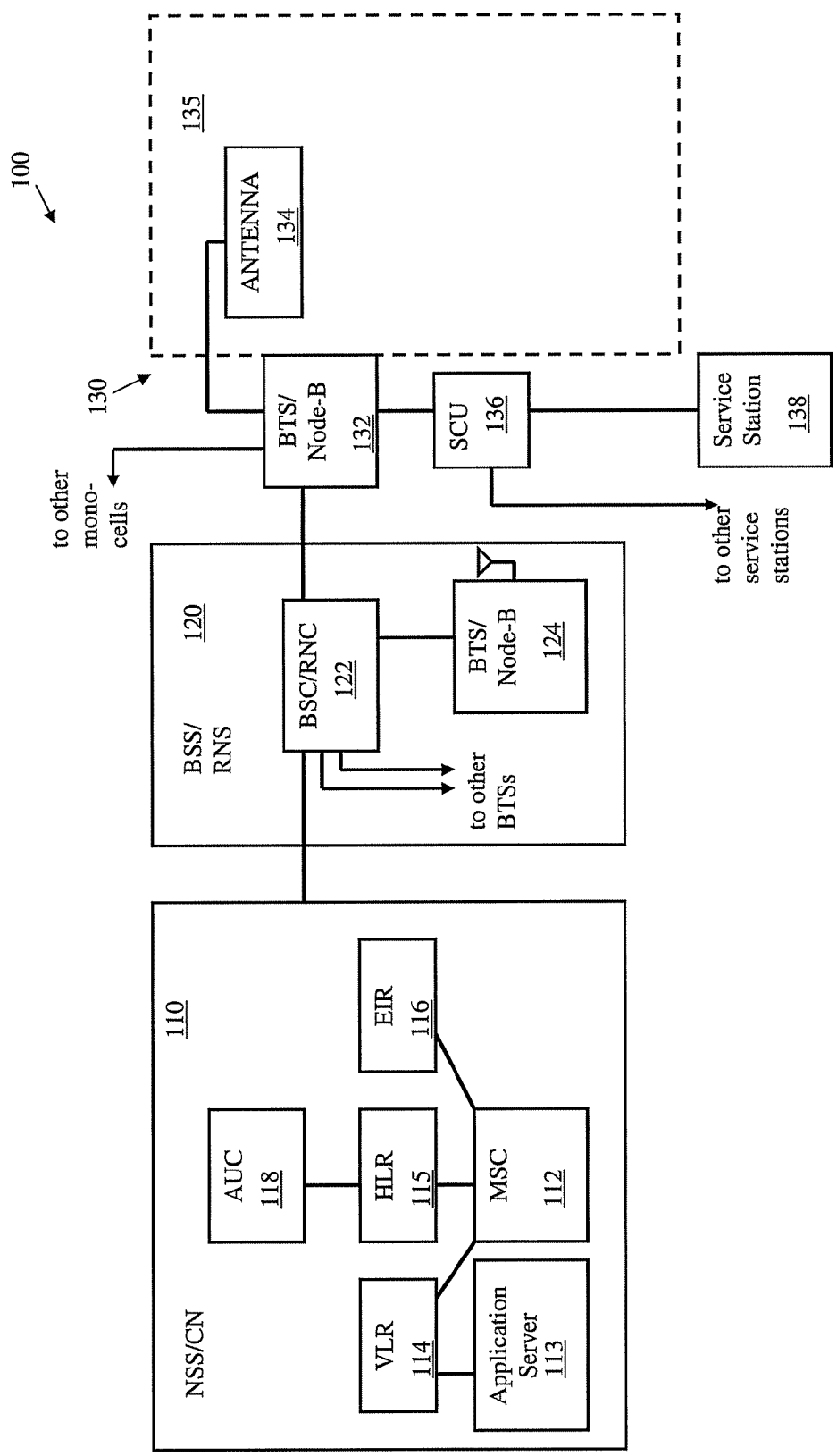
FIG. 1 is a schematic illustration of a payment system using a mobile device according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In the following description, the terms mobile unit, mobile station, mobile communication device, mobile phone are used to denote a mobile device, which is capable of wireless communication. The device may be a phone, personal digital assistant (PDA), wireless email device, satellite phone, global positioning service (GPS) device, etc. Although in the following description, the communication is described using an example of cellular communication, particularly, global system for mobile communication (GSM), it will be understood that the scope of the invention is not limited in this respect, and that the communication method used may be based on any suitable communication protocol, including Universal Mobile Telecommunications System (UMTS), IEEE 802.11x, IEEE 802.16x, CDMA etc.

Reference is made to FIG. 1, which is a schematic illustration of a system 100 for payment using a mobile device according to some embodiments of the present invention. System 100 may include a Network Switching Subsystem (NSS) or Core Network (CN) 110, a Base Station Subsystem (BSS) or Radio Network subsystem (RNS) 120, a mono-cell subsystem 130 and a service station 138.

Mono-cell subsystem 130 may include a mono-cell 135, which, as described below, in some embodiments of the invention, may be designed or adapted to include in its coverage area substantially one mobile device in dedicated mode. In some embodiments of the invention, mono-cell 135 may be designed or adapted to physically include no more than one mobile device. For example, according to one embodiment of the invention, the mono-cell 135 may have an aperture into which the mobile device is to be placed being physically incapable of receiving more than one device. Other methods of ensuring that no more than one device is included in mono-cell 135 may operate, for example, by detecting a signal from a mobile station in dedicated mode. In case two mobile stations in dedicated mode are detected, mono-cell 135 may be deactivated. In some embodiments of the invention, one or more sensors at the aperture of the device may detect whether more than one mobile device has been inserted into the aperture. Other variations are possible within the scope of the invention.

Mono-cell 135 may be proximate to a service station 138 and may enable payment for a service or product provided by service station 138 using a mobile station, for example, a cellular telephone device. Service station 138 may be any machine that provides a product or a service. Service station 138 may include, for example, a food, soft drink or cigarette vending machine, a parking fee payment machine, a movie theater ticket machine, a copier machine, a gate/door and/or any other suitable service station.

Mono-cell subsystem 130 may communicate with NSS 110 through BSS 120. Mono-cell subsystem 130 may enable identification of a mobile station (not shown) included in the coverage area of mono-cell 135, for example, a mobile phone physically inserted into mono-cell 135, by receiving from NSS 110 an identification code of the mobile station, such as, for example, a Temporary Mobile Subscriber Identification (TMSI) code in a GSM network. Based on the identification code, a user of the mobile station may be identified and debited for a product or service. After receiving the identification code, mono-cell subsystem 130, for example, by a Service Control Unit (SCU) 136, may instruct or control service station 138 to provide a product or service to the user of the mobile device. In other cases, for example, if an authentication process fails, NSS 100 may send a rejection notification which may force the mobile station to erase its identification code and/or may be received by SCU 136, which may, in this case, prevent from service station 138 from providing a service.

NSS 110 may be included in a cellular network. NSS 10 may include a Mobile services Switching Center (MSC) 112, which in different possible configurations and/or in other standard terminology may also be called, for example, GMSC, MIX, 3GMSC, SGSN, access GW or IWF-MSC, an application server 113 (for example, a gsmSCF), a Visitor Location Register (VLR) 114, a Home Location Register (HLR) 115, an Equipment Identity Register (EIR) 116 and an Authentication Center (AuC) 118. MSC 112 may control BSS 120 and possibly additional base station subsystems (BSS). Each BSS may include a base station controller, which may control one or more base transceiver stations. Each base transceiver station may define a cell, for example, by an antenna. The NSS and BSS systems may be substantially as known in the art or as provided in any mobile communication system, and will not be detailed at great length herein.

BSS 120 may include a Base Station Controller (BSC) 122, which in other standard terminology may also be called Radio Network Controller (RNC), and at least one Base Transceiver Station (BTS) 124, which in other standard terminology may also be called, for example, Node-B or eNode-B. Each base transceiver station may define a cell, for example, by the coverage of an antenna associated therewith. A mobile station may be attributed to a particular cell, for example, if the signal received by the mobile station from the corresponding BTS/Node-B antenna has a better quality than the signals received from other BTS/Node-B antennas, for example, because this BTS/Node-B antenna is closer and/or because there are fewer obstacles between the BTS/Node-B antenna and the mobile station.

In order that NSS 110 may notify a mobile station of an incoming call, for example, by MSC 112, NSS 110 may have to monitor the location of each mobile station powered on. Therefore, a mobile station may notify NSS 110 when roaming to a different location area. A location area may include a group of cells, which may have the same location area identifier/code (LAI/LAC). When a mobile station is powered on it may detect a location area identifier, which may be transmitted from BSC/RNC 122 through the cell's BTS/Node-B. When a mobile station moves to another cell of another location area, the mobile station may detect a different location area identifier and thus may initiate a mobility management procedure, for example, a location update procedure or a routing area update by, for example, sending a location update request to VLR 114, including, for example, an identification of the mobile station. VLR 114 may perform an authentication process with the mobile station. For example, the mobile station may have a unique authentication key, which may also be stored at AuC 118. In case the mobile station has roamed from a cell controlled by another VLR, VLR 114 may have to receive the authentication key and possibly other authentication codes and/or details of the mobile station from HLR 115 and/or AuC 118 and/or from a previous VLR. After the authentication is completed, a location update may be performed, in which VLR 114 may allocate an identification code to the mobile station. In some embodiments, for example, before allocating the identification code, VLR 114 may send details of the mobile station, for example, the real mobile identity, e.g. MSISDN, and the location area identifier, to application server 113, for example, by intelligent network method, for example, IN, CAP or any other suitable method. For example, VLR 114 may be required to send details of the mobile station to application server 113 if the location area identifier is associated with a specific cell, corresponding to an application controlled by application server 113, for example, mono-cell 135. Based on the details of the mobile station, application server 113 may identify the mobile station and/or a user of the mobile station, and decide whether to allow the mobility management procedure to be completed. If the mobility management procedure is approved by application server 113, VLR 114 may proceed to allocate an identification code to the mobile station.

The identification code may be associated with the current location area of the mobile station. Thus, for example, the identification code may enable VLR 114 to recognize the mobile station and its location. When an incoming call needs to be connected to the mobile station, MSC 112 may locate the mobile station, for example, by sending a paging message to all the mobile stations in the location area identified by the identification code of the mobile station.

Mono-cell subsystem 130 may be or include a small area cell, also known as a femtocell, for example, a BTS/Node-B 132, which may transmit signals through an antenna 134, which may define mono-cell 135. In some embodiments, for example as described below with reference to FIG. 3, mono-cell subsystem 130 may include a Faraday cage, or a barrier of conductive material, to reduce intensity of signals received from antennas external to the barrier and/or to reduce the intensity of signals from the mono-cell outside the cage, thereby defining a separate mono-cell 135 according to one embodiment of the invention. The mono-cell may be geographically located within a coverage area of at least one other BTS/Node-B cell, for example, BTS/Node-B 124. The radio parameters of BTS/Node-B 132 may be similar to radio parameter of a BTS/Node-B outside mono-cell 135, thus, for example, enabling a short registration period. Antenna 134 may be located inside this barrier, thus defining the separate mono-cell 135. The barrier of conductive material may further act to limit the coverage of the mono-cell outside the barrier, and therefore, its interference with mobile devices that are not engaging in a transaction with service station. It will be recognized that the barrier describe above is merely one embodiment of the invention, and that a separate cell may be defined using other techniques in other embodiments of the invention, for example by defining parameters of the mono-cell as such.

Mono-cell subsystem 130 may further include a Service Control Unit (SCU) 136, which may control service station 138. When a mobile station is inserted into mono-cell 135, SCU 136 may receive from NSS 110 an identification code of the mobile station. In one embodiment of the present invention, when a mobile station is inserted into mono-cell 135, a mobility management procedure, for example, a location update process may be initiated. In one embodiment of the present invention, mono-cell 135 may be configured to have a separate location area identifier. When the mobile station is inserted into mono-cell 135, the mobile station may detect a different location area identifier than the cell that the mobile station was in communication with outside mono-cell 135, thus, for example, initiating a mobility management procedure with NSS 110. The communication with NSS 110 may be performed, for example, through BTS/Node-B 132 and BSS 120. NSS 110 may perform an authentication process, and, for example, if the mobile station is authenticated, the mobile station may be registered to its new location. When the location of the mobile station is updated, NSS 110 may send to mono-cell 135 an identification code. The identification code may be associated with the location and/or may be allocated, for example, by VLR 114. SCU 136 may receive the identification code, for example, through BTS/Node-B 132. The identification code may be, for example, TMSI/P-TMSI/TLLI or any other temporary mobile station identification.

In some embodiments of the present invention, for example, when system 100 and the mobile station are compatible with a GSM network, the mobile station may include a smart card, for example, a SIM card. The smart card may store, for example, among other things, an International Mobile Subscriber Identity (IMSI), a Temporary Mobile Subscriber Identity (TMSI), a Ciphering Key (Kc) and an Authentication Key (Ki). When a mobile station is inserted into mono-cell 135, a location update process may be initiated. For example, the mobile station may detect a different location area identifier and thus, for example, initiate a location update process. The mobile station may send a location update request to MSC 112, for example, through BSS 120. The location update request may include the TMSI and the Location Area Identifier (LAI) associated with the TMSI. MSC 112 may forward these details to VLR 114 together with a message to update the location area. In case the new location area is controlled by the same VLR as the previous location area of the mobile station, VLR 114 may recognize the mobile station by the TMSI and/or LAI, and initiate an authentication process. VLR 114 may have authentication data stored therein, for example, specific to this mobile station. The authentication data may include, for example, the IMSI of the mobile station, a random number (RAND) and a Signed Response (SRES). In case VLR 114 does not recognize the mobile station based on the TMSI, for example, if the previous location area of the mobile station was controlled by another VLR, or if the mobile station was not registered to the network or/and was off before inserted into mono-cell 135, it may request and receive these details from HLR 115 and/or from the previous VLR. The IMSI of the mobile station may be received by VLR 114 and may be used in order to request the details corresponding to the mobile station from HLR 115 and/or from the previous VLR. New RAND and SRES may be generated by AuC 118 and, for example, sent to HLR 115, for example, after each authentication process or some of the authentication processes.

VLR 114 may initiate the authentication process by sending the RAND together with an authentication request to the mobile station. The mobile station may compute an SRES based on Ki, which is stored in the smart card, and the RAND, for example, by a predetermined algorithm, which may be notated, for example, by A3, which may use Ki and RAND together as an input. The SRES computed by the mobile station should be identical to the SRES stored in VLR 114, therefore, the mobile station may send the computed SRES to VLR 114 together with an authentication response. VLR 114 may check that the computed SRES is identical to the SRES stored therein. If the SRESs are identical, the authentication is successful. The authentication process may prevent duplication of mobile stations, for example, since in the authentication process a random number RAND may be transmitted through the network, while the keys and algorithms for the process may be stored at the mobile station and the authentication center, which may produce the SRES. In case the mobile station is duplicated, the mobile station may not be able to produce a SRES which is identical to the SRES stored in VLR 114.

If the authentication succeeds, VLR 114 may generate and/or allocate a new TMSI to the mobile station. The new TMSI may be transmitted to the mobile station, for example, in a ciphered mode. For the ciphering, the mobile station may use Kc, which may be stored therein. The ciphering method may be computed, for example, based on Kc and RAND, for example, by a predetermined algorithm, which may be notated, for example, by A8, which may use Kc and RAND together as an input.

VLR 114 may postpone the sending of the TMSI to the mobile station until receiving a confirmation from application server 113. Application server 113 may receive information from VLR 114, for example, location update details and/or a mobile station details, such as, for example, the real mobile identity and/or the LAI, together with a request for confirmation. VLR 114 may send the request for confirmation in case the current LAI of the mobile station is associated with a cell corresponding to an application controlled by application server 113, for example, mono-cell 135. Application server 113 may identify a user of the mobile station based on the mobile station details received from VLR 114. Based on the identity of the user, application server 113 may decide whether to approve or decline the mobility management procedure. In some embodiments, application server 113 may include a list of subscriber users to application service controlled by application server 113 and/or approved users and, for example, approve the mobility management procedure if the identified user appears in the list. In some embodiments, subscriber users may have a pre-paid account at the cellular service provider, and application server 113 may check the amount of money left in the pre-paid account in order to decide whether to approve or decline the mobility management procedure. In other embodiment, application server 113 may include a list of users to which a service should not be provided and, for example, decline the mobility management procedure if the identified user appears in this list. Additionally or alternatively, application server 113 may perform certain inquiries in order to decide if a service should be provided to the identified user, for example, inquiry with a credit card company, a bank, or with any other suitable database. Application server 113 may send approval or declination message to VLR 114. If an approval message is received, VLR 114 may complete the mobility management procedure, e.g., confirm the location update to BTS/Node-B 132 and/or send the TMSI to the mobile station. If a declination message is received, VLR 114 may not complete the mobility management procedure and may not confirm the location update to BTS/Node-B 132 and/or send the identification code to the mobile station. Possibly, VLR 114 may send a refusal message to BTS/Node-B 132. Application server 113 may operate by an intelligent network method, such as, for example, IN, CAP or any other suitable protocol.

In case the mobility management procedure fails, for example, during the authentication process, VLR 114 may inform the application server and/or BTS/Node-B 132.

Based on an identification code allocated to the mobile station in the mobility management procedure, SCU 136 may instruct or control service station 138 to provide a product or service to the user of the mobile device. The identification code may be, for example, the TMSI which may be received in the location update process in a GSM network, as described above, or any other suitable identification code such as, for example, P-TMSI, TLLI or IP.

If the authentication process and/or the location update process fails, the identification code may not be sent to the mobile station and/or may not be received by SCU 136. If the identification code is not received, for example, after a predetermined period of time, SCU 136 may prevent service station 138 from providing a service, for example, for a predetermined freeze-out period, or until the mobile device is withdrawn from the mono-cell. Alternatively, SCU 136 may receive a failure code from NSS 110 instead of the identification code, and then may prevent service station 138 from providing a service.

In case SCU 136 prevents service station 138 from providing a service, it may notify the user that the service is denied. For example, SCU 136 may include an indicator to indicate failure and/or success of the process. The indicator may include, for example, control lamps, display, vocal indicator, or any other indication means. Additionally or alternatively, application server 113 may instruct NSS 110 to send a message to the mobile station, which may indicate failure and/or success of the process.

SCU 136 may control a number of service stations. In order to relate mobile station details to the correct service station, SCU 236 may receive from NSS 210 details in addition to the identification code, such as, for example, a mono-cell code, which may identify the particular mono-cell and the corresponding service station, and/or the time of the transaction, for example, based on the time the location update process was made.

In some embodiments, the cellular service provider may collect the money from the user for the service provided by service station 138. For example, the cellular service provider may have a payment settlement with the operator of service station 138, for example, in which the cellular service provider pays to the service operator and then collects the money from the user, or alternatively, the cellular service provider may pay to the service operator only after collecting the money from the user. Alternatively, the cellular service provider may also be the operator of service station 138. In this embodiment, SCU 136 may provide a confirmation to service station 138 to provide a service upon receipt of the identification code, because, for example, the cellular service provider may directly identify the mobile station, and thus, for example, the details of the user, based on the identification code.

In an embodiment of the present invention, the mobile station may be a prepaid device, e.g., the calls and/or other operations done by the mobile station may be prepaid. In this case, for example, the debit for the service provided by service station 138 may be subtracted from the pre-paid amount.

In other embodiments, as described in more detail herein below, the operator of service station 138 may collect the charge for the service in a variety of ways. In those embodiments, an additional identification process may be required in order that the operator may identify the user.

In some embodiments of the present invention, mono-cell system 130 and/or may enable the providing of service by service station 138 for several mobile stations in parallel. In these embodiments, mono-cell 135 may include several mobile stations in parallel, and the mobility management process may be performed to all of them in parallel. When the mobility management process is completed and all of the mobile stations receive the identification code as described in detail above, SCU 136 may allow service station 138 to provide a service.

Figure 2:
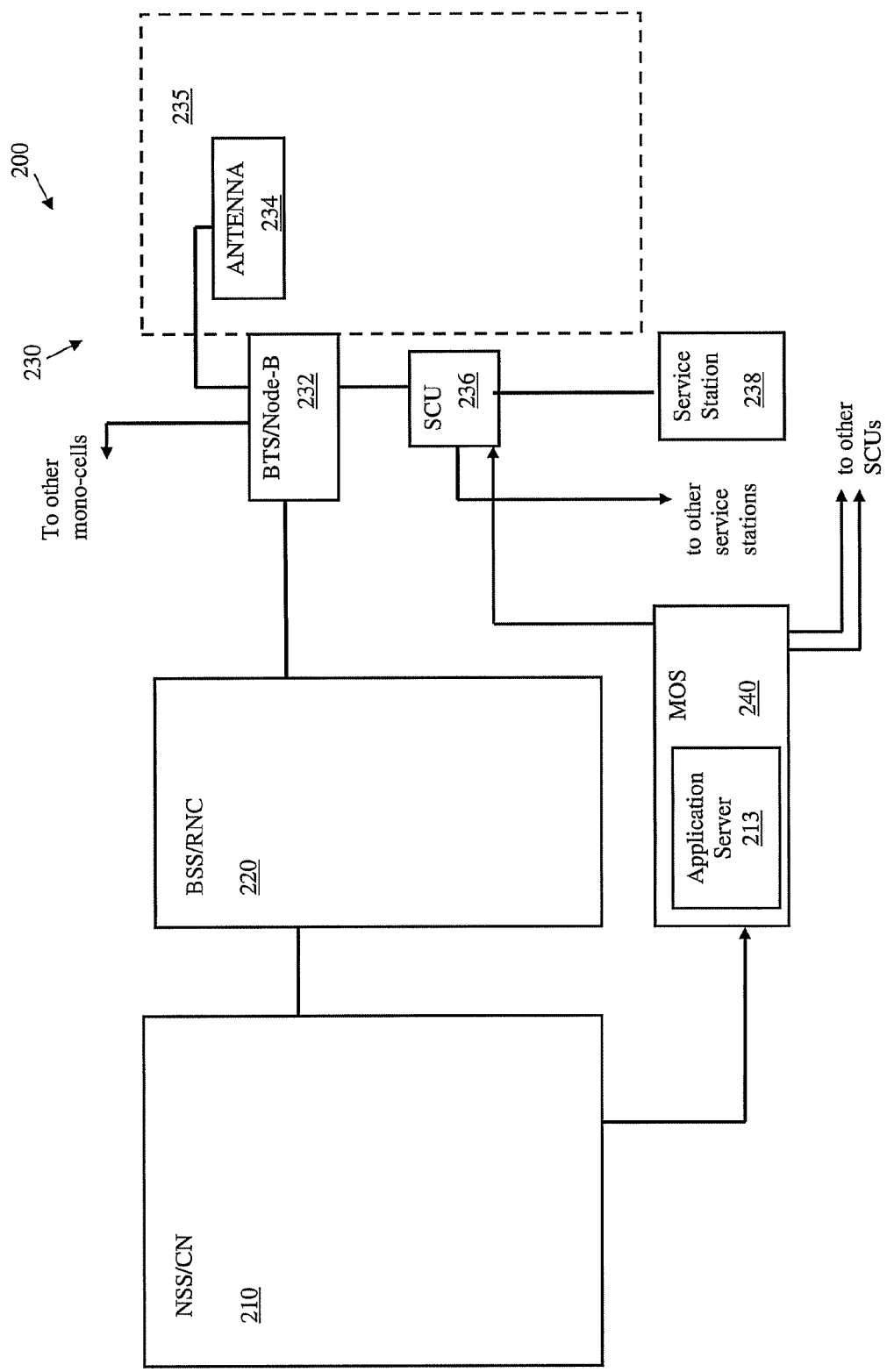
FIG. 2 is a schematic illustration of a payment system using a mobile device according to some embodiments of the present invention.

Reference is now made to FIG. 2, which is a schematic illustration of a system 200 for payment using a mobile communication device according to some embodiments of the present invention. System 200 may include a NSS 210, a BSS 220, a mono-cell subsystem 230 and a service station 238, which may operate similarly to the corresponding elements of system 100 described above. Mono-cell subsystem 230 may include a mono-cell 235, which may be able to include one mobile station in dedicated mode, and a BTS/Node-B 232, which may define mono-cell 235 by an antenna 234. Mono-cell subsystem 230 may further include a Service Control Unit (SCU) 236, which may control service station 238. System 200 may further include a mono-cell Operator Server (MOS) 240, which may control service station 238, for example, by SCU 236.

MOS 240 may identify a mobile station and/or a user of the mobile station, for example, by an application server 213, which may be included in NSS 210 or in MOS 240. Application server 213 may operate similarly to application server 113 described above with reference to FIG. 1. MOS 240 may include the payment details of the user, for example, payment means details and/or the amount of the user debit. Application server 213 may identify the user based on mobile station details received from NSS 210. Based on the identity of the user, application server 213 may decide whether to enable providing a service to the user. The decision may be made based on data received from NSS 210, MOS 240 and/or other databases. If the user is approved for receiving a service, application server 213 may send a confirmation to NSS 210 which may complete the mobility management procedure as described above, and then, for example, SCU 236 may permit service station 238 to provide a product or service. MOS 240 may receive from application server 213 a notice on a transaction made together with the user details. MOS 240 may then, for example, add a corresponding amount to the user debit. A communication between MOS 240 and application server 213, or example, in order to update of details of a user and/or of additional transactions, may be performed periodically.

In one exemplary embodiment, application server 213 may receive from NSS 210 a mobile station number, for example, a cellular phone number, corresponding to the identification code. Application server 213 may match mobile station numbers with details of subscribers. For example, application server 213 may include a table including the identities of the subscribers and/or, for example, the payment means details of the subscribers, alternatively, application server 213 may be in communication with data-bases including details of users, for example, data-bases included in MOS 240. After application server 213 identifies a subscriber based on the mobile station number, it may allow NSS 210 to proceed with the mobility management process, and thus, for example, SCU 236 may confirm to service station 238 that a service may be provided.

In case the mobile station number does not match any of the subscribers' details, application server 213 may send a rejection message to NSS 210, which may send a rejection message to SCU 236 accordingly. Alternatively, application server 213 may send a rejection message directly to SCU 236. After receiving the rejection message, SCU 236 may prevent service station 238 from providing a service.

MOS 240 and/or application server 213 may control a number of service stations, which may be controlled by SCU 236 or by other service control units. In order to relate mobile station details to the correct service station, application server 213 may receive from NSS 210 and/or from the service control units, details in addition to the identification code and/or the mobile station number, such as, for example, a mono-cell code, which may identify the mono-cell and the corresponding service station, and/or the time of the transaction, for example, based on the time the location update process was made.

In some embodiments, SCU 236 may require additional input from a user, such as, for example, a personal code and/or other identification. SCU 236 or BSS/RNC 220 may send the identification entered by the user to MOS 240. The identification entered by the user may be received by application server 213 and may facilitate the identification of the user and the confirmation by application server 213.

Figure 3:
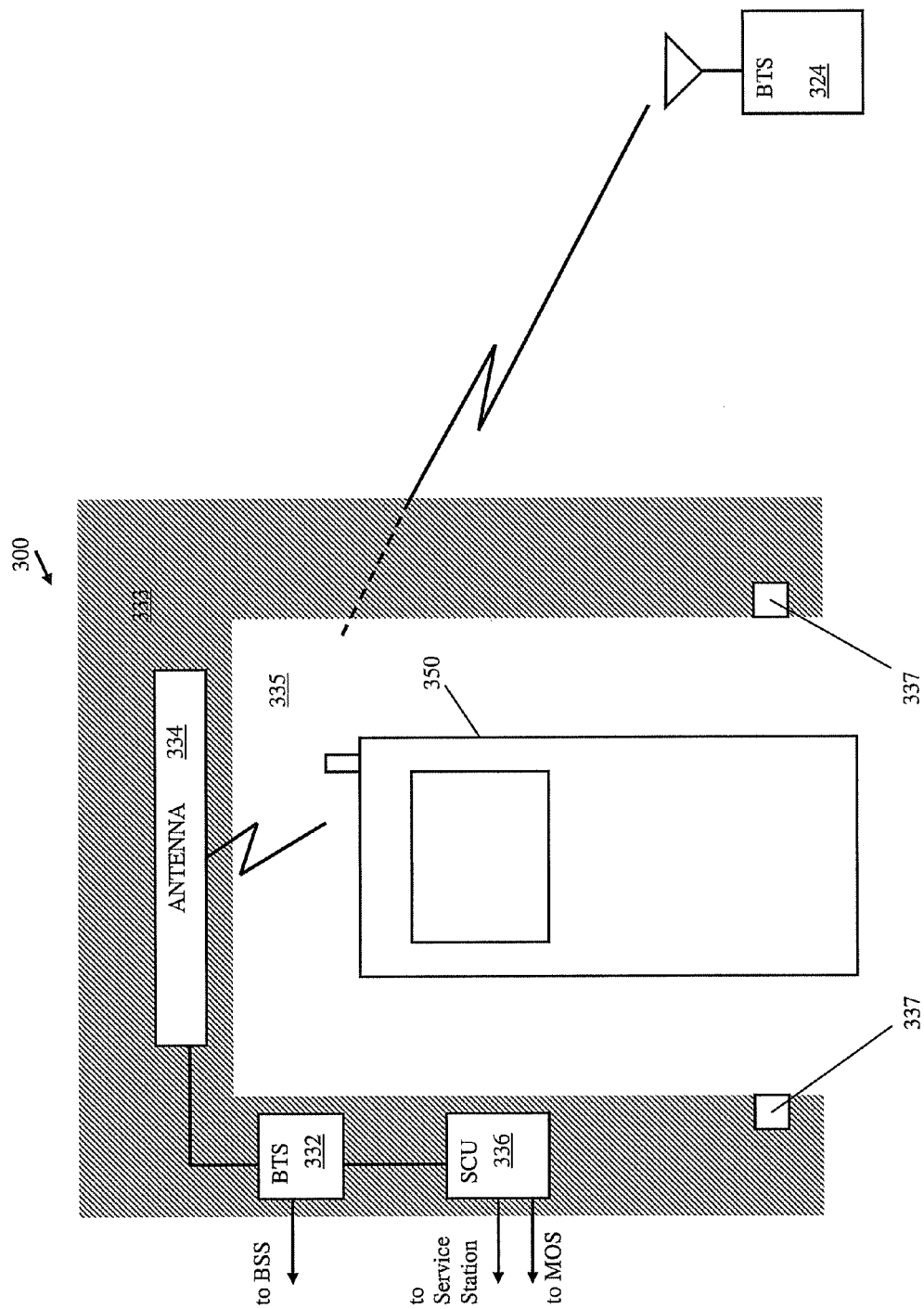
FIG. 3 is a schematic illustration of a mono-cell subsystem according to some embodiments of the present invention.

Reference is now made to FIG. 3, which is a schematic illustration of a mono-cell subsystem 300 according to some embodiments of the present invention. It will be recognized that the illustration of FIG. 3 is merely one possible embodiment of a mono-cell and that other arrangements or configurations are possible. In the embodiment shown, mono-cell subsystem 300 may include a BTS/Node-B 332, an antenna 334, a SCU 336, a barrier 333 and detectors 337. BTS/Node-B 332 may define a cell 335 by the coverage of antenna 334. Barrier 333 may be a three-dimensional structure, for example, a box or a cylinder, and may be made of a material so as to decrease intensity within barrier 333 of signals emitted by antennas external to barrier 333, for example, a BTS 324. Thus, a mobile station 350 inserted into cell 335 may sense signals from antenna 334 as sufficiently stronger than signals from external antennas, for example, BTS 324, so as to cause mobile station 350 to select cell 335 for coverage handoff. Cell 335 may typically be able to include one mobile station in dedicated mode. This may be done by, for example, limiting the dimensions of barrier 333 so that no more then one mobile station can be inserted into cell 335. Additionally or alternatively, detectors 337 may sense, for example, whether more than one mobile station is present within cell 335. Detectors 337 may be any suitable detectors, for example light, infrared, ultrasound, RF, etc. Detectors 337 may notify SCU 336 that more than one mobile station is present within cell 335, and thus, for example, SCU 336 may prevent a service station controlled by SCU 336 from providing a service.

Cell 335 may be configured to have a location area identifier different than at least some, or preferably all of the cells surrounding and/or outside of it. Accordingly, when mobile station 350 is inserted into cell 335, a location update procedure may be initiated by mobile station 350. As described above, if the location update procedure succeeds, the mobile station may receive an identification code, for example, related to the location area. SCU 336 may receive the identification code through BTS/Node-B 332. As described above with reference to FIGS. 1 and 2, based on the identification code, SCU may permit or refuse service station 238 to provide a service.

Figure 4:
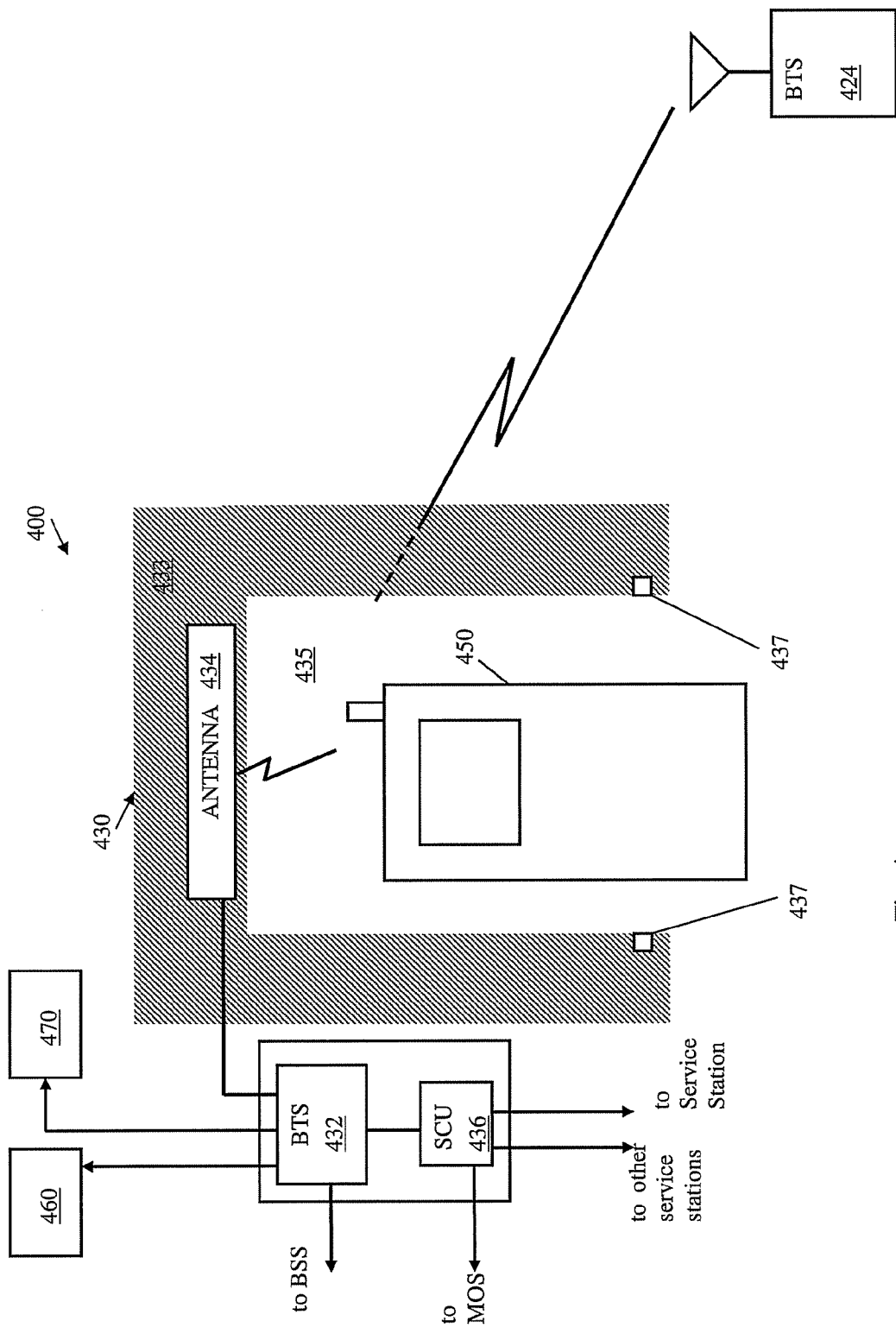
FIG. 4 is a schematic illustration of a mono-cell subsystem including more than one mono-cell according to embodiments of the present invention.

Reference is now made to FIG. 4, which is a schematic illustration of a mono-cell subsystem 400 including more than one mono-cell according to embodiments of the present invention. Mono-cell subsystem 400 may include BTS/Node-B 432 and SCU 436. BTS/Node-B 432 may define mono-cells 430, 440, 460 and possibly additional mono-cells, for example, by controlling antennas, which may define the cells. For example, mono-cell 430 may include a barrier 433 which may facilitate isolation of a cell 435 defined by antenna 434. Barrier 433 may decrease intensity of signals from antennas external to barrier 433, for example, a BTS 424, in order that a mobile station 350 inserted into cell 435 may sense signals from antenna 434 which may be strong relative to signals from external antennas, for example, BTS 424, which may cause mobile station 450 to select cell 435. Mono-cell 430 may further include detectors 432, for example, functioning as described above. Each of mono-cells 430, 440 and 460 may correspond to a different service station, e.g., may enable payment by a mobile station for a service provided by a different service station. When a mobile station is inserted into one of the mono-cells, for example, mono-cell 430, SCU 436 may receive a mono-cell code identifying the mono-cell and the corresponding service station. For example, SCU 436 may receive the mono-cell code together with the identification code related to the location update and/or together with any other transmission related to a specific mono-cell. When SCU 436 receives the mono-cell code together with, for example, the identification code or failure code, SCU 436 may send the corresponding service station the confirmation or denial to provide a service, respectively.

Figure 5:
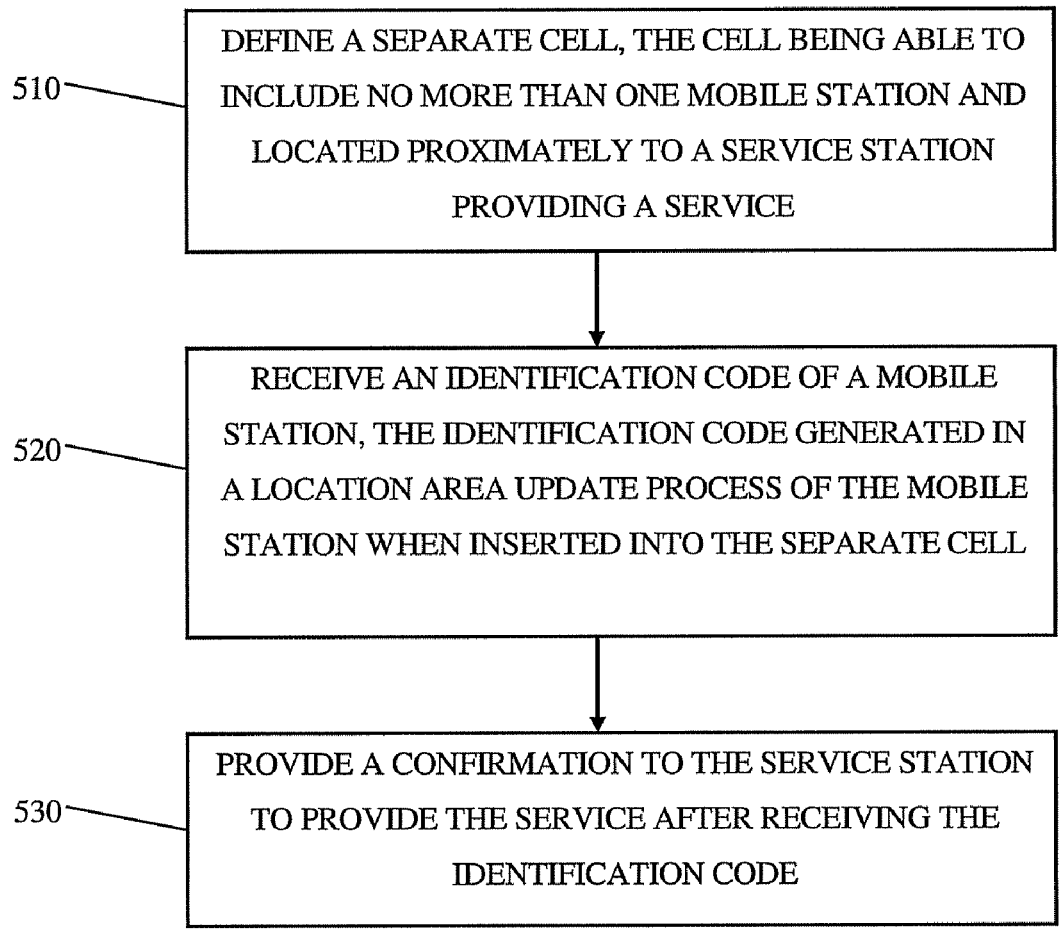
FIG. 5 is a flowchart illustrating a payment method using a mobile device according to some embodiments of the present invention.

Reference is now made to FIG. 5, which is a flowchart illustrating a method for payment using a mobile device according to some embodiments of the present invention. As indicated in block 510, the method may include defining a separate cell. While in some embodiments described above, the mono-cell may be defined by physical boundaries, for example, by a shielded container, substantially as a Faraday cage, there may be other ways to define the cell consistent with the present invention. In some embodiments, the mono-cell may be defined by a directional antenna defining a narrow and short-range coverage area suitable for substantially one mobile phone, for example, such that only one mobile device may be brought into communication with the mono-cell, for example, by contact with the antenna radome. As discussed above, the mono-cell may typically be able to include one or no more than one mobile station. Additionally, the cell may be located proximate to a service station providing a service, for example, in order to enable payment for a service provided by the service station by a mobile device.

As indicated in block 520, the method may include receiving an identification code of a mobile station, the identification code generated during a location area update process of the mobile station when inserted into the separate cell. The cell may be configured to have a separate location area identifier, for example, in order that a location area procedure may be initiated upon insertion of a mobile station to the cell. As indicated in block 530, the method may include providing a confirmation to the service station to provide a service after receiving the identification code. The identity of the mobile station may be received by an operator server or database from the cellular network based on the identification code.

Based on the identity of the mobile station, the operator server and/or an application server included in the NSS, for example, a gsmSCF, may check whether a user of the mobile station is a subscriber of the operator server. The confirmation to provide a service may be provided to the service station, for example, after it is confirmed that a user of the mobile station is a subscriber of the operator server. The user of the mobile station may be debited for the service provided by the service station based on the identity of the mobile station.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A system for providing a product or service to a mobile station, the system comprising:
   a transceiver in communication with a cellular network;
   a barrier of conductive material arranged as a three dimensional structure defining an area within said barrier, said barrier of conductive material arranged to reduce the intensity of signals received from antennas external of said barrier by a mobile station disposed in said defined area within said barrier;
   an antenna disposed within said defined area within said barrier, said antenna disposed within said defined area in communication with said transceiver and with the mobile station when the mobile station is disposed within said defined area within said barrier, said transceiver outputting via said antenna signals of a better quality in respect to signals from the external antennas received by the mobile station disposed within said defined area;
   a service control unit; and
   a service station responsive to said service control unit;
   said service control unit arranged to:
      obtain from the cellular network an identification code temporarily allocated by the cellular network to the mobile station within the defined area, said identification code being temporarily allocated by the cellular network responsive to said mobile station being disposed within said defined area, said temporarily allocated identification code being associated with cellular network service; and
      provide a confirmation to said service station to provide a product or service responsive to said received temporarily allocated identification code.

2. The system of claim 1, wherein said temporarily allocated identification code is generated during a mobility management procedure of the mobile station when brought within said defined area.

3. The system of claim 1, wherein said antenna disposed within said defined area has a location area identifier different from the location area identifier associated with at least one of said external antennas.

4. The system of claim 1, wherein said antenna disposed within said defined area has a location area identifier different from location area identifiers associated with the external antennas.

5. The system of claim 1, wherein said mobile station is configured to initiate a mobility management procedure when brought within said defined area, said identification code temporarily allocated by the cellular network as part of said initiated mobility management procedure.

6. The system of claim 1, further comprising a detector arranged to detect presence of the mobile station within said defined area.

7. The system of claim 1, wherein said barrier is adapted to house substantially no more than one mobile station at any time.

8. The system of claim 1, wherein said barrier constitutes a Faraday cage.

9. The system of claim 1, wherein said transceiver is arranged such that in the event that a plurality of mobile stations are detected within said defined area, said transceiver is deactivated.

10. The system of claim 1, further comprising an operator server in communication with the cellular network, the cellular network providing identification information of the mobile station disposed within said defined area to said operator server.

11. The system of claim 10, wherein said operator server is arranged to determine, based on said provided identification information of the mobile station disposed within said defined area, whether a user of the mobile station disposed within said defined area is a subscriber of said operator server.

12. The system of claim 10, wherein said temporarily allocated identification code is provided by the cellular network responsive to said operator server.

13. The system of claim 10, wherein said operator server is arranged to debit a user of the mobile station disposed within said defined area for the product or service provided by said service station based on said provided identification information of the mobile station disposed within said defined area.

14. The system of claim 2, wherein said mobility management procedure is a location area update process.

15. The system of claim 14, wherein said service control unit denies said confirmation to the service station to provide said product or service in the event that a rejection notification is received from the cellular network.

16. A method of providing a product or service, the method comprising:
   providing a barrier of conductive material arranged as a three dimensional structure defining an area within said barrier, said barrier arranged to reduce the intensity of signals received from antennas external to said barrier by a mobile station disposed within said defined area;
   providing an antenna disposed within said defined area, said antenna transmitting signals of a better quality to the mobile station disposed within said defined area than said reduced intensity signals from the external antennas;
   receiving from an associated cellular network a temporary identification code allocated to the mobile station disposed within said defined area, said identification code being temporarily allocated by the cellular network responsive to said mobile station being disposed within said defined area, said temporary identification code being associated with a cellular network service; and
   providing, responsive to said received temporary identification code, a confirmation to a service station to provide the product or service.

17. The method of claim 16, wherein said temporary identification code is generated in a mobility management procedure performed responsive to the mobile station being inserted within said defined area.

18. The method of claim 16, wherein said antenna disposed within said defined area has a location area identifier different from the location area identifier of at least one adjoining external antenna.

19. The method of claim 16, wherein said antenna disposed within said defined area has a location area identifier different from location area identifiers of substantially all adjoining external antennas.

20. The method of claim 16, further comprising detecting presence of the mobile station within said defined area.

21. The method of claim 16, wherein said provided barrier is adapted to house substantially no more than one mobile station at any time.

22. The method of claim 21, wherein said provided barrier constitutes a Faraday cage.

23. The method of claim 16, further comprising:
providing an operator server in communication with the associated cellular network,
wherein said receiving said temporary identification code of the mobile station disposed within said defined area is responsive to the associated cellular network providing identification information of the mobile station disposed within said defined area to said provided operator server.

24. The method of claim 23, further comprising determining, based on said received identity of the mobile station disposed within said defined area, whether a user of the mobile station disposed within said defined area is a subscriber of said provided operator server.

25. The method of claim 24, wherein said providing said receiving of the temporary identification code is responsive to said determination that the user of the mobile station disposed within said defined area is a subscriber of said provided operator server.

26. The method of claim 16, further comprising debiting a user of the mobile station disposed within said defined area for the product or service provided by said service station.

27. The method of claim 17, wherein said mobility management procedure is a location area update process.

28. The method of claim 16, wherein said receiving of the temporary identification code is only in the event that the location area update process is completed successfully.

29. The method of claim 16, further comprising denying said confirmation to the service station in the event that a rejection notification is received from the cellular network.

* * * * *